Jan. 1, 1929.
A. R. A. HAGE
1,697,355
HOLDER FOR RAZOR BLADES
Filed Aug. 11, 1926
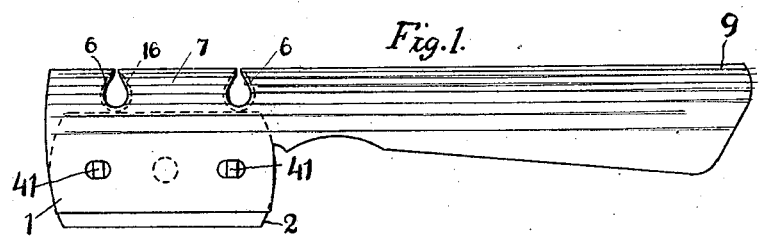
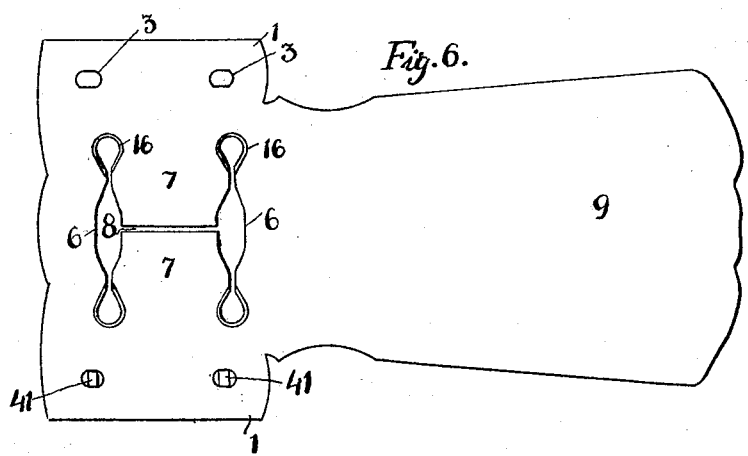
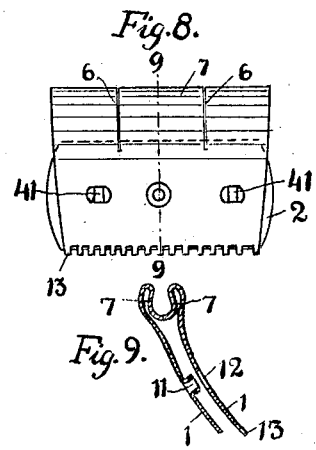
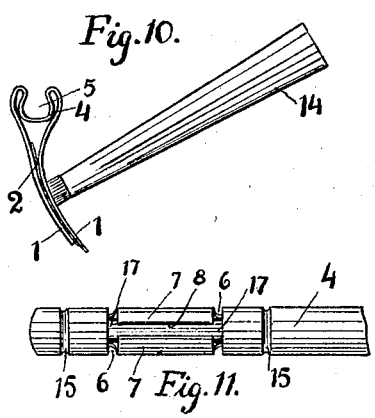
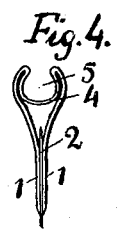
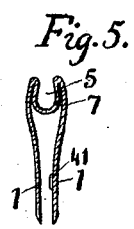
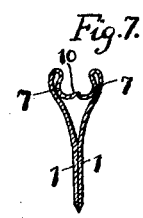
Inventor
Arne R. A. Hage.
By William C. Linton
Attorney.

Patented Jan. 1, 1929.

1,697,355

UNITED STATES PATENT OFFICE.

ARNE ROLAND ALEXANDER HAGE, OF GOTTENBURG, SWEDEN, ASSIGNOR TO JULIUS WILHELM HAGE, OF CAPE TOWN, SOUTH AFRICA.

HOLDER FOR RAZOR BLADES.

Application filed August 11, 1926, Serial No. 128,653, and in Sweden May 26, 1926.

The present invention relates to holders for razor-blades of the type comprising two wings movably connected to each other and adapted to receive between them the razor-blade and hold the same in proper position for the shaving or stropping.

The invention has for its principal object to provide a holder of this type which will enable the insertion of the razor-blade between said wings and its securing thereto in a very simple manner and also readily permit the removal of the blade from the holder in a short time.

Another object of the invention is to provide a holder which is of a very simple construction and consequently cheap in manufacture.

These and other objects of the invention will be clear by the following description with reference to the accompanying drawing illustrating by way of example some embodiments of the invention.

In the drawing Fig. 1 shows a side elevation of one form of the holder. Fig. 2 is a top plan view thereof. Fig. 3 is an end elevation of the same holder. Fig. 4 is a similar view with a razor-blade placed between the wings of the holder as also shown by Fig. 1. Fig. 5 is a cross-section of the holder on the line 5—5 in Fig. 2 and showing the outer ends of the wings separated. Fig. 6 is a plan view of a stamped sheet metal piece of which the holder is formed by suitable bending. Fig. 7 shows a cross-section of a holder according to a somewhat modified construction. Fig. 8 is a plan view of a holder according to another embodiment. Fig. 9 is a cross-section on the line 9—9 in Fig. 8 showing the wings of the holder separated. Fig. 10 is a side elevation of the same holder. Fig. 11 is a top plan view of a portion of a holder according to still another embodiment. Fig. 12 is an end elevation of this holder.

With reference to the holder shown by Figs. 1 to 6, 1 denotes the two wings of the holder between which the razor-blade 2 can be secured. As clearly shown by Fig. 6 one of said wings is provided with two holes 3 and the other wing with similar holes crossed by tongues 41 which are pressed out so as to project through the usual holes of the razor-blade 2 when the latter is placed in proper position between the wings as shown by Fig. 1. Characteristic of the present invention is the fact that the wings 1 are formed out of the same sheet of metal, said wings being connected by a bent portion or ridge 4 of such a design as to resiliently hold the wings forced against each other. The ridge 4 is bent inwardly thereby forming a groove or channel 5 along the entire length of the holder. The ridge of the holder is cut through by two transverse recesses 6 and the portion 7 of the ridge between these recesses is cut through by a longitudinal recess 8 at the bottom of the groove or channel 5. Thus between the recesses 6 two flaps are formed the edges of which are adapted to bear against each other as evidently shown by Figures 2 and 5. Owing to the resilient character of the ridge 4 the wings 1 are pressed against each other and when the wings are to be separated for the insertion or removal of a razor-blade 2 the curved flaps 7 are pressed against each other whereby the wings will separate. In such movement the wings will maintain a substantial parallel position as shown by Fig. 5.

In order to stiffen the ridge the edge portions at the recesses 6 may be flanged or bent as shown at 16 in Figs. 1 and 6.

In the embodiment shown by Figures 1 to 6 also the handle 9 of the holder is formed integrally with the wings 1, the groove or channel 5 extending preferably also along the whole length of the handle.

The entire holder is formed out of one piece as shown by Fig. 6 stamped out of sheet metal. By means of a suitable machine the blank is bent so as to form the groove or channel 5 and at the same time the sides of the blank are folded against each other.

The holder shown in cross-section in Fig. 7 differs from the one just described only thereby that the edge portions of the flaps 7 are bent as shown at 10 so that said portions will bear against each other by curved surfaces when the flaps are pressed against each other for the separating of the wings.

In the holder described with reference to Figs. 1 to 7 the outer portions of the wings are formed substantially straight so that the razor-blade will not be bent when pressed between the wings. This construction is therefore especially adapted as a holder for razor-blades in the stropping thereof. In view of this purpose the width of the ridge is adapted to suit to the width of the wings so that the blade will assume proper angle to the stropping surface when the flat side of the holder is in touch with it.

The construction shown by Figures 8 to 10 is intended for use in the shaving with razor-blades. This holder differs from the former substantially therein that the wings 1 have a curved shape so that the razor-blade is bent as shown when placed between them. In order to secure the razor-blade firmly between the wings 1, one of them is formed with an exteriorly threaded cylindric projection 11 extending from the inside of the wing and adapted to extend through the conventional central hole of the razor blade and a corresponding hole 12 in the opposite wing 1. The latter wing is somewhat longer than the other and provided with teeth 13 in the manner customary with safety razors. When a razor-blade is to be placed between the wings 1 the flaps 7 are pressed against each other whereby the wings 1 are separated sufficiently to permit the insertion of the blade between the wings (see Fig. 9) with the cylindric projection 11 extending through the central hole of the blade whereupon the flaps 7 are released so that the tongues 41 engage the remaining two holes of the razor-blade and the cylindric projection 11 projects through the hole 12 in the opposite wing. A handle 14, provided with threads at its one end, can now be screwed on the threaded projection 11 and tightened so that the pressure of the wings 1 against the razor-blade 2 will be increased by the tightening of the handle 14.

The embodiment of the holder shown by Figs. 11 and 12 is of the same type as the one shown by Figs. 1 to 6 but with the difference that the ridge 4 is curved convexly. Thus there is no longitudinal groove or channel on the outside of the ridge. The said ridge is preferably provided with transverse grooves 15 on opposite sides of the recesses 6 in order to stiffen the ridge. A longitudinally slit socket or tube 17 of a resilient material extends along the ridge at the inside thereof and has for its object to provide a resilient support for the flaps 7. Such slit socket or tube may also be provided in the groove or channel 5 of the concavely bent ridge, shown in Figs. 1 to 10, in which case the socket or tube will increase the resilient force of the ridge 4.

As easily understood this construction of the holder operates substantially in the same manner as that one shown by Figures 1 to 6 whereas the wings 1 also in this case are separated by forcing the flaps 7 between the recesses 6 against each other and the wings are pressed against each other as soon as the wings are released.

Naturally I do not limit my invention to the embodiments shown and described but I want to be free to vary the details thereof within the scope of the appended claims. For instance, the recesses 6 and 8 may be of some other form than that one shown in the drawing.

What I claim is:—

1. A razor-blade holder comprising a pair of opposed wings, a ridge formed with said wings for resiliently connecting the same together, said ridge being bent inwardly to form a channel, a handle formed with said wings and extending in a longitudinal direction with that of the ridge, said handle being bent in accordance with the ridge so that the channel formed therein extends contiguous with that of the wings, opposed flaps formed with said wings whereby when pressure is exerted upon said flaps the wings will be separated for permitting the insertion of a blade therebetween.

2. A safety razor-blade holder formed from a single sheet of metal, the medial portion of said sheet of metal being bent to form a ridge and a pair of opposed spring pressed wings, opposed flaps formed with said wings at their points of connection with the ridge, said wings being resiliently retained together by said ridge whereby a safety razor-blade may be retained therebetween and by squeezing such flaps together, said wings will be separated for releasing a razor-blade retained therebetween.

In witness whereof I have hereunto set my hand.

ARNE ROLAND ALEXANDER HAGE.